US 011928214 B2

United States Patent
Suryanarayana et al.

(10) Patent No.: US 11,928,214 B2
(45) Date of Patent: Mar. 12, 2024

(54) ENABLING SPI FIRMWARE UPDATES AT RUNTIME

(71) Applicant: Dell Products L.P., Round Rock, TX (US)

(72) Inventors: Shekar Babu Suryanarayana, Bangalore (IN); Anand Prakash Joshi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 208 days.

(21) Appl. No.: 17/391,617

(22) Filed: Aug. 2, 2021

(65) Prior Publication Data

US 2023/0031974 A1 Feb. 2, 2023

(51) Int. Cl.
*G06F 21/57* (2013.01)
*G06F 8/65* (2018.01)

(52) U.S. Cl.
CPC .............. *G06F 21/572* (2013.01); *G06F 8/65* (2013.01); *G06F 21/575* (2013.01)

(58) Field of Classification Search
CPC .......... G06F 21/572; G06F 8/65; G06F 21/575
See application file for complete search history.

(56) References Cited

U.S. PATENT DOCUMENTS

| | | | |
|---|---|---|---|
| 2018/0004505 A1* | 1/2018 | Annapureddy | G06F 21/572 |
| 2019/0095623 A1* | 3/2019 | Narasimhan | G06F 21/572 |
| 2020/0042710 A1* | 2/2020 | Liu | G06F 21/575 |
| 2020/0320200 A1* | 10/2020 | Singh | G06F 8/65 |
| 2021/0141626 A1* | 5/2021 | Ladkani | G06F 3/0604 |
| 2021/0303287 A1* | 9/2021 | Wiginton | G06F 8/65 |

FOREIGN PATENT DOCUMENTS

WO    WO-2020192925 A1 * 10/2020 ......... G06F 12/1009

* cited by examiner

*Primary Examiner* — Jaweed A Abbaszadeh
*Assistant Examiner* — Hyun Soo Kim
(74) *Attorney, Agent, or Firm* — Kirton McConkie; Brian Tucker (57) ABSTRACT

SPI firmware updates can be performed at runtime. A secure SPI flash access domain can be created during pre-boot and used at runtime to deliver and write a SPI firmware update to SPI flash. The secure SPI flash access domain can ensure that only a trusted component running on a trusted CPU core can access a SPI memory layout used to deploy the SPI firmware update to the SPI flash. Once the SPI firmware update is written to the SPI flash, a reboot can be triggered so that the updated SPI firmware is loaded to perform the boot process.

20 Claims, 11 Drawing Sheets

ENABLING SPI FIRMWARE UPDATES AT RUNTIME

CROSS-REFERENCE TO RELATED APPLICATIONS

N/A

BACKGROUND

BIOS firmware (BIOS) is the first software that is executed on the central processing unit (CPU) when a computing device is powered on. The primary task of the BIOS is to initialize the hardware and load the operating system (OS). As part of this process, other types of firmware may also be executed. Accordingly, the term "firmware" will be used to generally represent conventional (legacy) BIOS, Unified Extensible Firmware Interface (UEFI) BIOS, similar firmware that is used to boot a computing device and firmware of other hardware that a computing device may have (e.g., network card firmware, video card firmware, storage device firmware, etc.). In short, firmware can be viewed as the executable code and data on a computing device that is loaded before the operating system is loaded and may or may not remain loaded/running after the operating system is loaded. Some firmware, such as the UEFI BIOS, is oftentimes stored on a serial peripheral interface (SPI) flash chip. The term "SPI firmware" will be used to represent such firmware.

Figure 1:
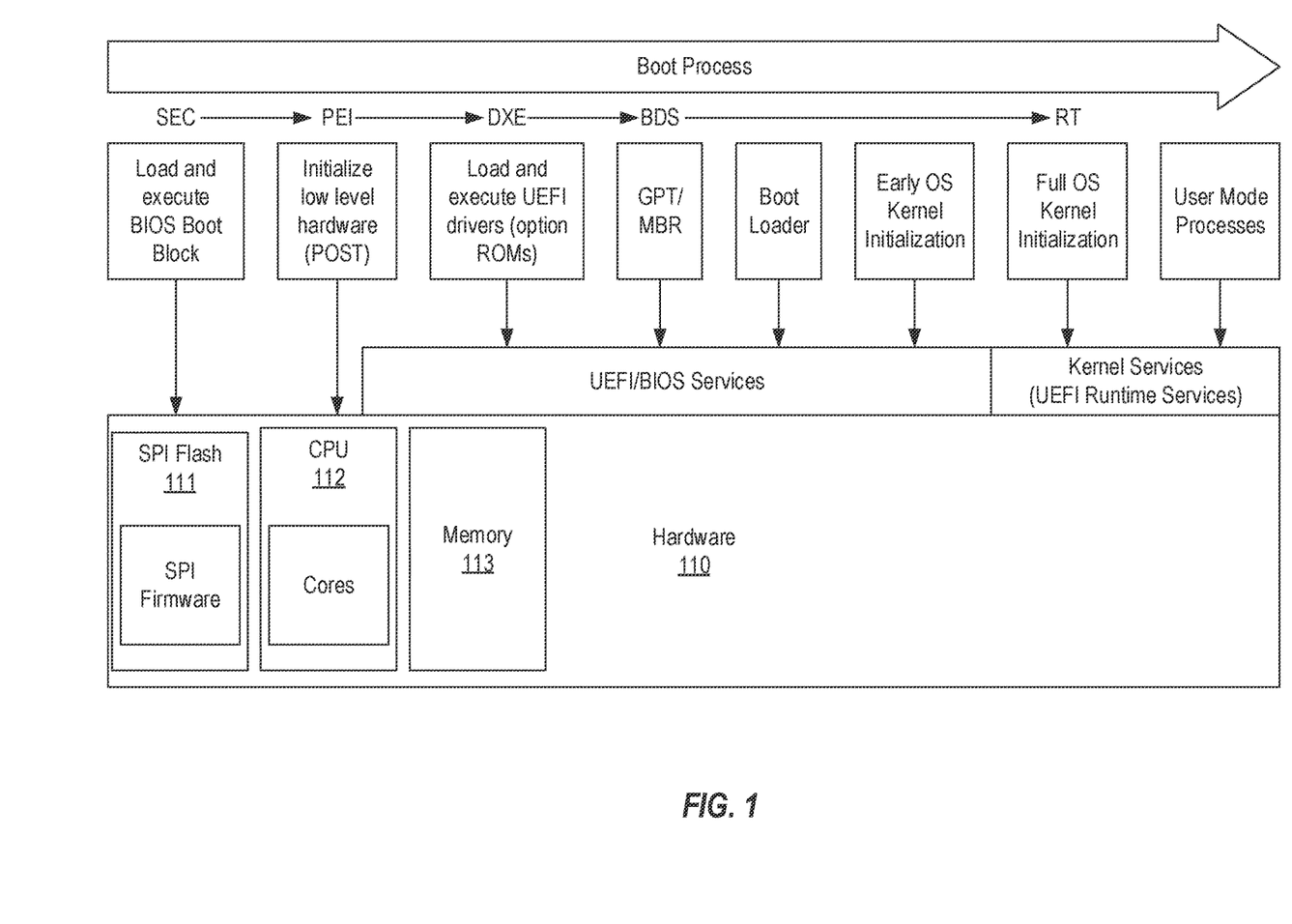
FIG. 1 illustrates an example of a typical boot process that can be performed on a computing device.

FIG. 1 represents how firmware can perform a boot process on a computing device in the context of the UEFI. FIG. 1 depicts hardware 110 which can represent all of the various types of hardware that may exist on a computing device including SPI flash 111 on which SPI firmware is stored, a CPU 112 which may have multiple cores, memory 113, etc. The SPI firmware may oftentimes include the boot block, which is the initial firmware that is loaded and executed in the SEC phase when the computing device is powered on or resets (e.g., the code that the reset vector points to), as well as other portions of UEFI BIOS or other firmware that may be loaded during subsequent phases of the boot process.

During the PEI phase, PEIM modules (or drivers) are loaded to initialize the low level hardware such as CPU 112 and memory 113. Additional UEFI services are also loaded and provide an interface for subsequent stages including the Driver Execution Environment (DXE) phase in which UEFI drivers are loaded to perform a variety of tasks. The boot process will then transition to the Boot Device Selection (BDS) phase where the GUID Partition Table (GPT) or Master Boot Record (MBR) is accessed to identify and load the OS boot loader. The OS boot loader will then load the OS kernel and transfer control to the OS.

During this boot process, the SPI firmware on SPI flash 111 may be updated. With current UEFI firmware update techniques, an update capsule containing the SPI firmware update can be delivered at runtime to the UEFI. Because SPI flash 111 is write locked at runtime for security reasons, the computing device will need to reboot so that the SPI firmware update can be written to SPI flash 111 during the pre-boot process. Accordingly, using current techniques, when the user installs a SPI firmware update, the user will have to wait while the runtime components interface with the UEFI to deliver the SPI firmware update, then the user will be forced to reboot. During the reboot, the user will again have to wait as the SPI firmware update is written to SPI flash 111. Once the write is completed, the boot process can be reset to cause the updated SPI firmware to be loaded. Accordingly, the process of updating the SPI firmware can be very tedious and frustrating for the user.

BRIEF SUMMARY

The present invention extends to methods, systems, and computer program products for enabling SPI firmware updates at runtime. A secure SPI flash access domain can be created during pre-boot and used at runtime to deliver and write a SPI firmware update to SPI flash. The secure SPI flash access domain can ensure that only a trusted component running on a trusted CPU core can access a SPI memory layout used to deploy the SPI firmware update to the SPI flash. Once the SPI firmware update is written to the SPI flash, a reboot can be triggered so that the updated SPI firmware is loaded to perform the boot process.

In some embodiments, the present invention may be implemented as a method for updating SPI firmware at runtime. A secure SPI flash access domain can be created during pre-boot. Then, a SPI firmware update can be received at runtime. The SPI firmware update can then be written at runtime to SPI flash using the secure SPI flash access domain.

In some embodiments, the present invention may be implemented as computer storage media storing computer executable instructions which when executed implement a method for updating SPI firmware at runtime. A SPI firmware update that is stored in a virtual address space can be identified at runtime. An identifier of a core of a CPU to can be used to obtain access to a SPI memory layout. The SPI firmware update can then be relocated to the SPI memory layout. The SPI firmware update can then be deployed at runtime from the SPI memory layout to SPI flash to thereby update SPI firmware stored on the SPI flash.

In some embodiments, the present invention may be implemented as a computing device that includes a multi-core CPU, SPI flash, memory and computer executable instructions which when executed implement a method for updating SPI firmware stored on the SPI flash at runtime. The method includes: creating, during pre-boot, a SPI memory layout in the memory; receiving, at runtime, a SPI firmware update; determining that a component is executing on a trusted core of the multicore CPU; after determining that the component is executing on the trusted core of the multicore CPU, allowing the component to relocate the SPI firmware update to the SPI memory layout; and after the SPI firmware update is relocated to the SPI memory layout, writing, during runtime, the SPI firmware update to the SPI flash.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 2:
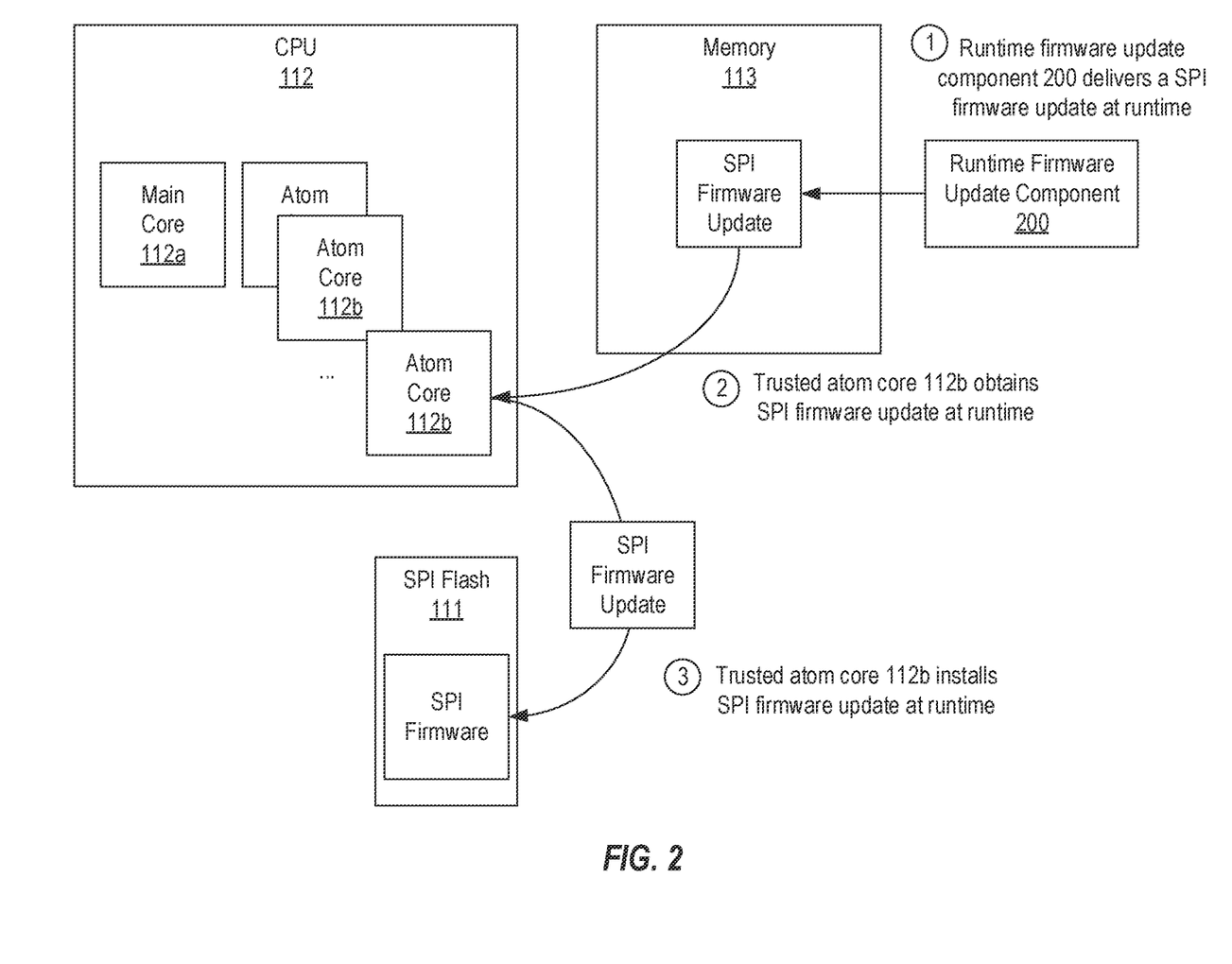
FIG. 2 illustrates an example of how an SPI firmware update can be written to SPI flash as runtime.

FIG. 2 provides an overview of how embodiments of the present invention enable SPI firmware to be updated at runtime. In this example, it is assumed that CPU 112 has a hybrid architecture consisting of a main core (or cores) 112*a* and multiple atom cores 112*b*. Main core 112*a* may typically be a higher-powered core, while each atom core 112*b* may be a lower-powered core. However, embodiments of the present invention can be implemented on a computing device having a CPU with multiple cores regardless of whether the cores may be considered high-power, low-power or otherwise. Of primary relevance, embodiments of the present invention enable one of the cores of a multi-core CPU to be used as a trusted/verified core for purposes of installing a SPI firmware update at runtime.

In FIG. 2, it is also assumed that the operating system is running (i.e., the computing device is no longer in pre-boot mode) and that a runtime firmware update component 200 is also running. In step 1, runtime firmware update component 200 can deliver a SPI firmware update to memory 113. In step 2, a trusted atom core 112*b* can obtain the SPI flash update from memory 113 at runtime (i.e., without a reboot occurring between steps 1 and 2). Then, in step 3, the trusted atom core 112*b* can write the SPI firmware update to SPI flash 111 at runtime (i.e., without a reboot occurring between steps 1 and 3).

Notably, for this SPI flash update to occur at runtime, it is necessary that SPI flash 111 be in write-enabled mode at runtime (or at least while the update is performed). To enable SPI flash 111 to remain in write-enabled mode at runtime without creating security vulnerabilities, embodiments of the present invention can create a secure SPI flash access domain during the pre-boot process which persists during runtime and can operate independent of the operating system. Additionally, to ensure that only trusted SPI flash updates are installed, embodiments of the present invention can provide mechanisms for securing the delivery of SPI flash updates to the secure SPI flash access domain.

Figure 3:
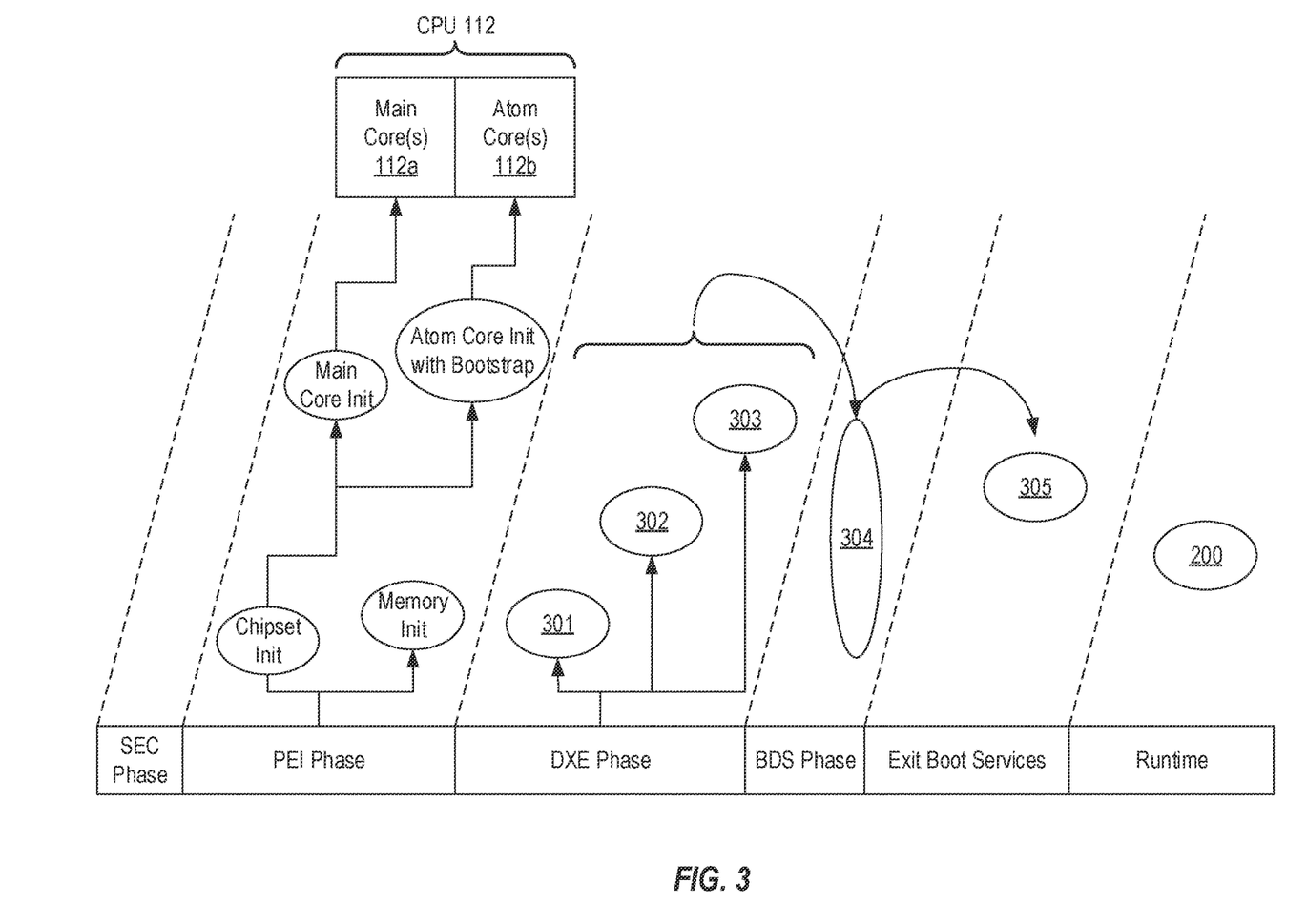
FIG. 3 represents how a secure SPI flash access domain can be created during pre-boot.

FIG. 3 provides an example, in the context of a UEFI boot sequence, of how embodiments of the present invention may create a secure SPI flash access domain during the pre-boot process. As shown, during the PEI phase, appropriate modules are loaded to initialize the chipset, including CPU 112, and memory 113. The modules may include one or more modules for initializing each main core 112*a* of CPU 112 and one or more modules for initializing each atom core 112*b* of CPU 112. In accordance with embodiments of the present invention, a bootstrap can be included as part of the module(s) for initializing atom core(s) 112*b* and can configure one atom core 112*b* to function as a SPI write domain master in the secure SPI flash access domain (i.e. a trusted atom core 112*b*) for purposes of performing a SPI flash update at runtime. In some embodiments, the bootstrap may also be configured to cause SPI flash 111 to remain in write-enabled mode during runtime.

To configure a trusted atom core 112*b* to function as a SPI write domain master, the bootstrap can create (or cause to be created) a secure access token using an identifier of one of atom cores 112*b* which can subsequently be used in the secure SPI flash access domain to ensure that only the trusted atom core 112*b* is given write access to SPI flash 111 at runtime. Stated another way and as described in greater detail below, the use of the secure access token can restrict runtime access to SPI flash 111 only to trusted component(s) that run on the trusted atom core 112*b*. In some embodiments, the bootstrap may create the secure access token by creating a signed hash of an identifier of one of atom cores 112*b*. Once the bootstrap creates the secure access token, the secure access token can be stored for use at runtime.

During the DXE phase, a number of modules can be loaded to perform additional functionality for creating the secure SPI flash access domain. These modules, which may be in the form of one or more UEFI drivers in some embodiments, may include a relocation and memory remap module 301, a SPI memory layout module 302 and a SPI firmware updater 303.

SPI memory layout module 302 can be configured to create, during pre-boot, a SPI memory layout that can be used to perform a SPI firmware update at runtime and can implement restrictions for securing access to the SPI memory layout. For example, during the DXE phase, SPI memory layout module 302 can allocate pages of memory 113 to be used as the SPI memory layout. In some embodiments, SPI memory layout module 302 may function at runtime to protect unauthorized access to SPI memory layout. For example, SPI memory layout module 302 may use the secure access token to ensure that only trusted components executing on the trusted atom core 112*b* can access the SPI memory layout.

Relocation and memory remap module 301 can be configured to remap the SPI memory layout so that it remains accessible at runtime. At runtime, relocation and memory remap module 301 can also be configured to relocate/unpack an SPI flash update from a virtual address space into the SPI memory layout from which it may be deployed to SPI flash 111. For example, when runtime firmware update component 200 delivers a SPI firmware update at runtime, firmware update component 200 will likely be running on main core 112*a* and the SPI firmware update will exist in a virtual address space of the operating system. In such cases, after appropriate security mechanisms have been implemented, which are described below, relocation and memory remap module 301 can unpack the SPI firmware update from the virtual address space into the SPI update memory layout where it can be operated on in the context of the trusted atom core 112*b* in preparation for writing the SPI firmware update to SPI flash 111. In some embodiments, relocation and memory remap module 301 may employ a UEFI accelerated capsule update protocol to access and unpack the SPI firmware update.

SPI firmware updater 303 can represent the component(s) that carry out the SPI firmware update. For example, once relocation and memory remap module 301 has unpacked the SPI firmware update into the SPI update memory layout, SPI firmware updater 303 can be invoked to interface with SPI flash 111 to write the SPI flash update to SPI flash 111. In some embodiments, SPI flash updater 303 may employ a runtime concurrent update protocol to perform this update.

During the BDS phase, a client interface 304 can be created which may include a set of APIs by which relocation and memory remap module 301, SPI memory layout module 302, SPI firmware updater 303 and the SPI update memory layout can be made accessible at runtime. For example, client interface 304 can be used to create one or more runtime interfaces 305 by which runtime firmware update component 200 can interface with relocation and memory remap module 301 and SPI firmware updater 303 for purposes of initiating an update to the SPI firmware at runtime.

It is noted that the exact nature, number, relationship, configuration, etc. of the modules used to perform a SPI flash update at runtime is not essential to embodiments of the present invention. Therefore, FIG. 3 should be viewed as one example only of how the functionality of the present invention may be accomplished and should not be viewed as limiting embodiments of the present invention to any particular number or type of modules or other components.

Figure 4A:
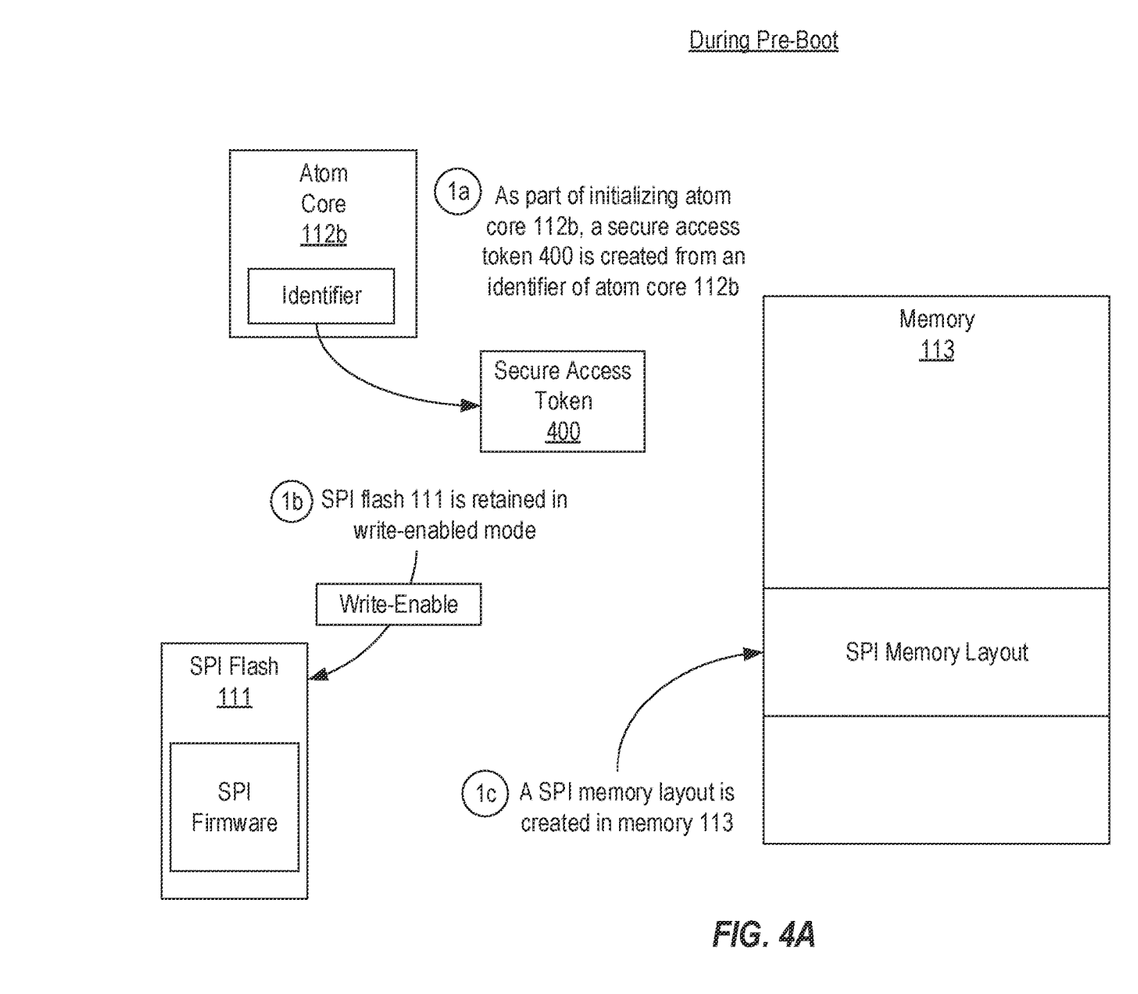
FIGS. 4A-4H provide an example of how SPI firmware can be updated at runtime.

FIGS. 4A-4H provide an example of how one or more embodiments of the present invention may enable SPI firmware updates at runtime. FIG. 4A represents functionality that may be performed during pre-boot to create the secure SPI flash access domain. In step 1a, as part of initializing atom core 112b, a secure access token 400 can be created from an identifier of atom core 112b. For example, in some embodiments, a bootstrap may be included with the chipset initialization firmware that is loaded during the PEI phase and may select one of atom cores 112b and use its identifier to create secure access token 400. In step 1b, SPI flash 111 can be retained in write-enabled mode. For example, the bootstrap (or another component) could set SPI flash 111 in write-enabled mode or could prevent SPI flash 111 from being set in a write-protected mode. In step 1c, an SPI memory layout can be created in memory 113. For example, SPI memory layout module 302 could allocate sufficient memory to store the payload of a SPI firmware update that may be subsequently received at runtime. Although not shown, relocation and memory remap module 301, SPI firmware updater 303, runtime interfaces 305 and other components such as the protocols described below could be loaded/created during this pre-boot process.

Figure 4B:
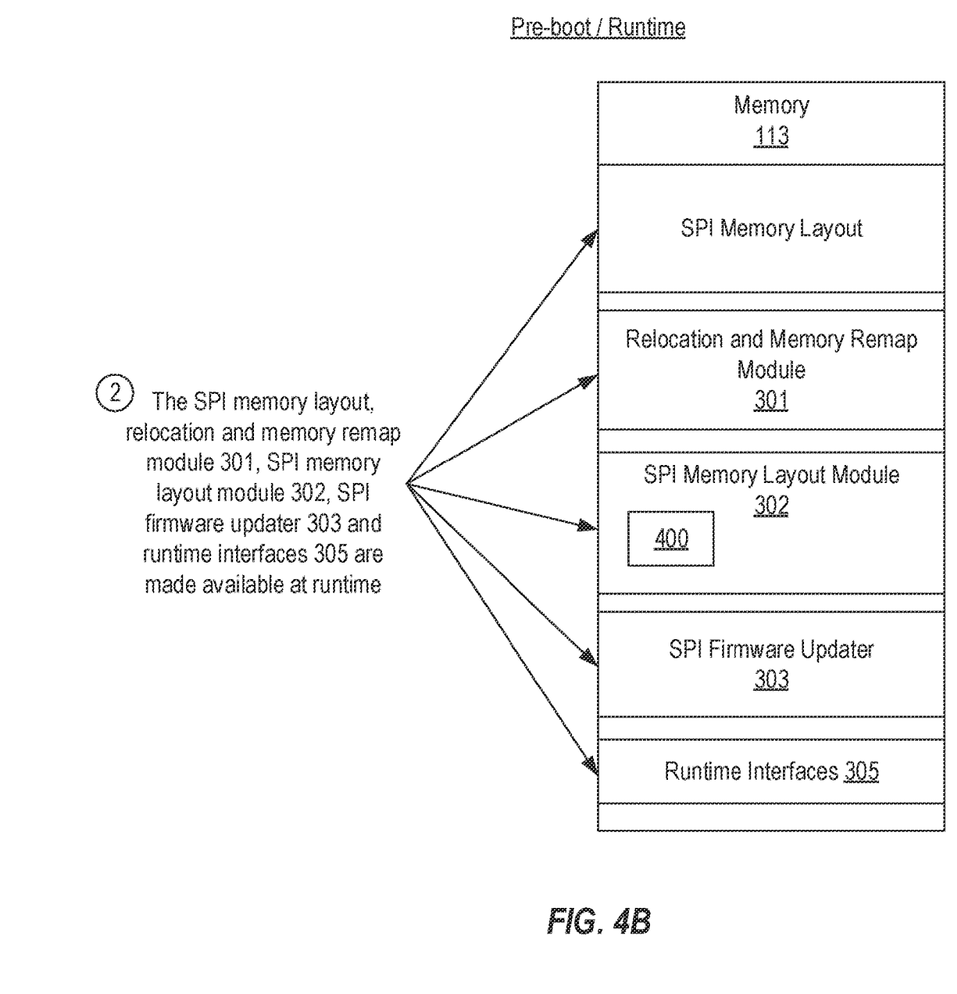

Turning to FIG. 4B, in step 2, after the pre-boot processing has been performed to create the secure SPI flash access domain, the SPI memory layout, relocation and memory remap module 301, SPI memory layout module 302, SPI firmware updater 303 and runtime interfaces 305 can be made available at runtime (e.g., so that they remain available after ExitBootServices( ) is called). Notably, SPI memory layout module 302 can retain secure access token 400 for use in verifying attempts to access the SPI memory layout at runtime. Also, in some embodiments, relocation and memory remap module 301 and SPI firmware updater 303 can be configured so that they will be loaded on the trusted atom core 112b when they are executed at runtime. For example, the bootloader can create an affinity between the atom core 112b for which it creates secure access token 400 and relocation and memory remap module 301 and SPI firmware updater 303.

Figure 4C:
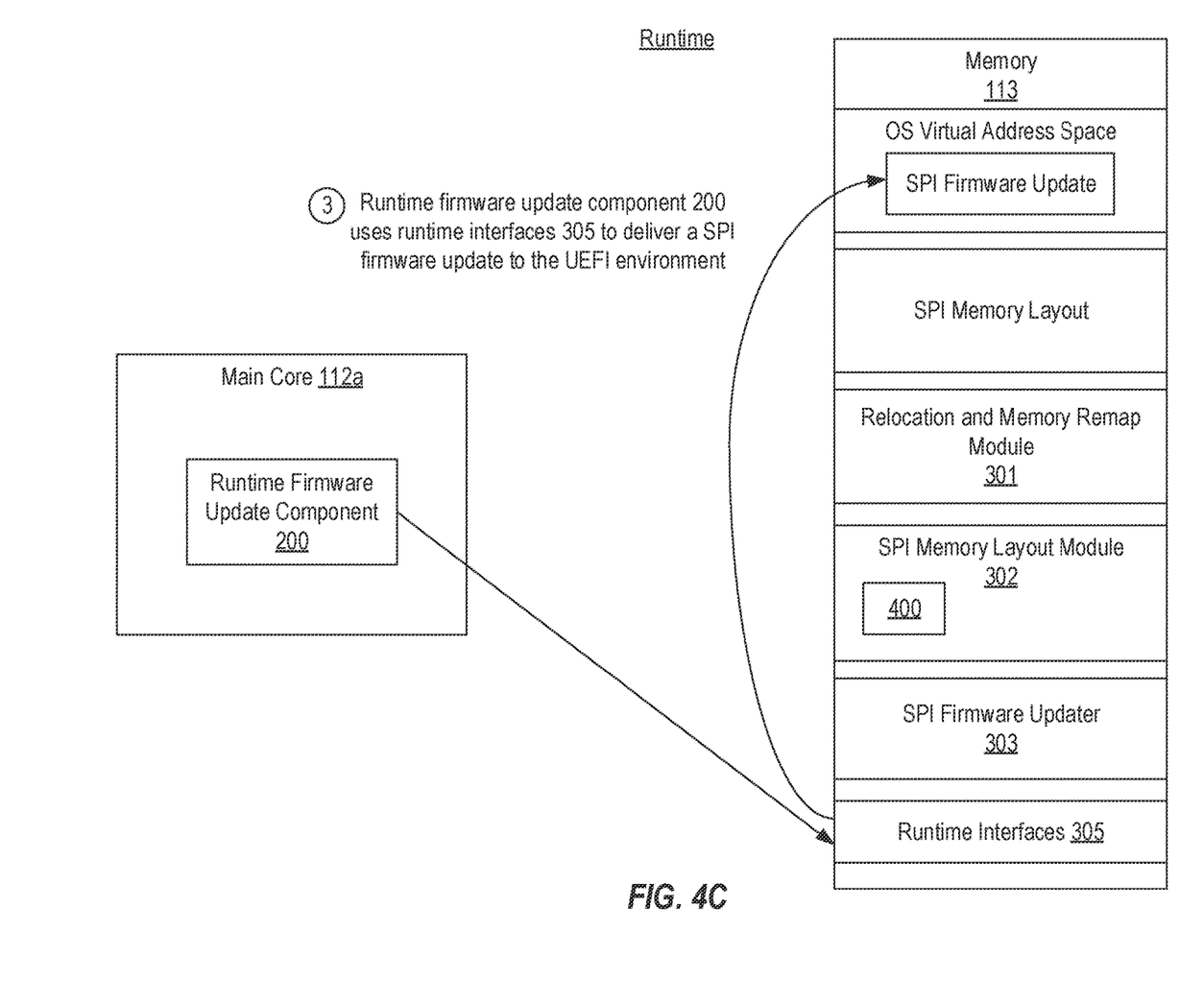

Turning to FIG. 4C, it is now assumed that the operating system has been loaded (i.e., that it is runtime) and therefore the operating system maintains a virtual address space in memory 113. It is also assumed that runtime firmware update component 200 has been loaded and is executing on main core 112a. For example, runtime firmware update component 200 could be in the form of a .exe that is used to deploy a SPI firmware update from the OS environment. In step 3, runtime firmware update component 200 can use runtime interfaces 305 to deliver a SPI firmware update to the UEFI environment. As shown, this SPI firmware update will be stored in the OS's virtual address space in memory 113 when it is delivered.

Figure 4D:
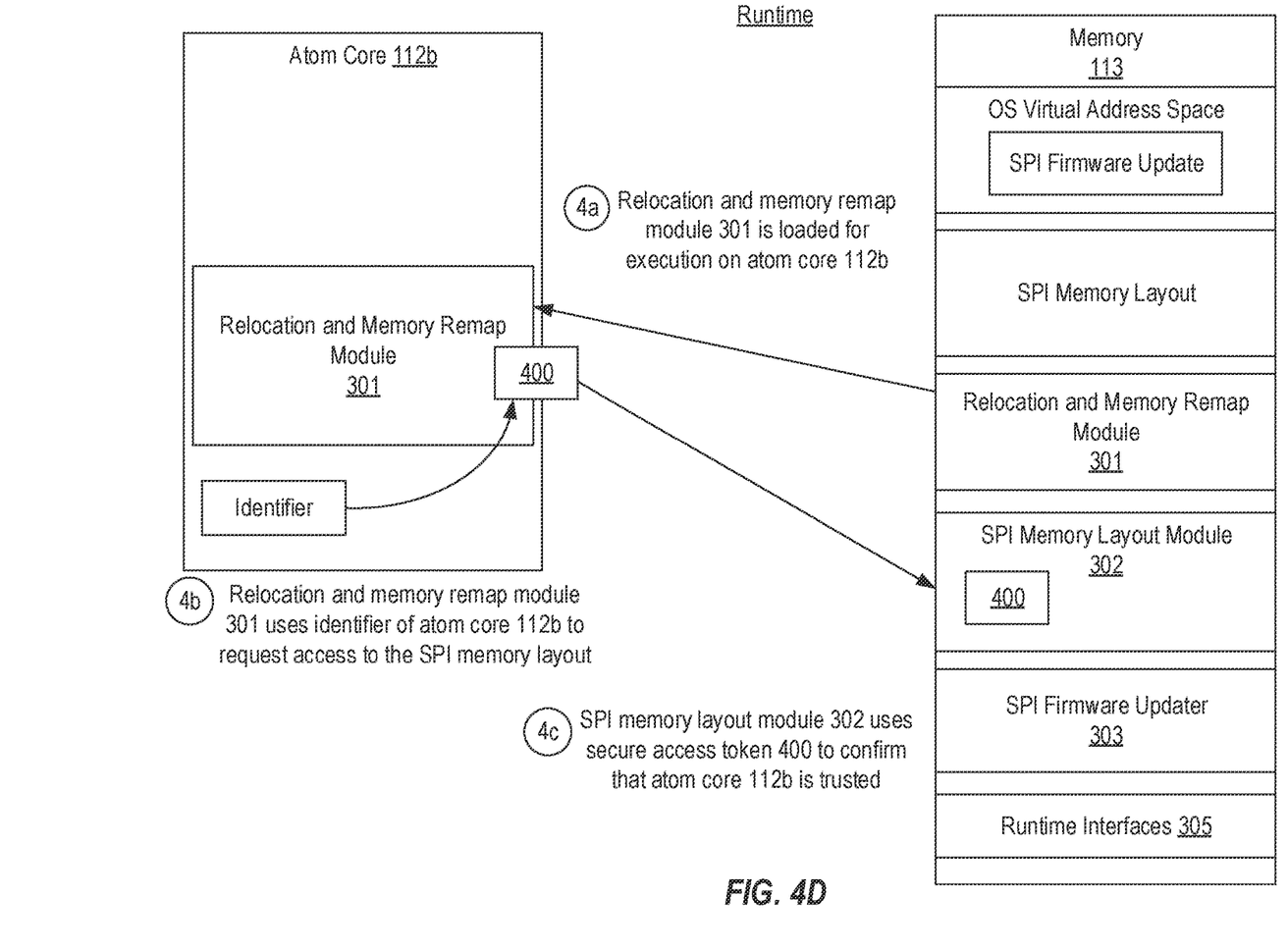

Turning to FIG. 4D, in response to the delivery of the SPI firmware update, relocation and memory remap module 301 can be loaded on atom core 112b to process the SPI firmware update. In step 4b, relocation and memory remap module 301 can obtain the identifier of atom core 112b and use it to create a secure access token 400 for requesting access to the SPI memory layout from SPI memory layout module 302. Notably, relocation and memory remap module 301, as a trusted component, can have access to the secure key or other information for creating a secure access token 400 that will match the secure access token 400 created by the bootstrap during pre-boot. Also, because relocation and memory remap module 301 uses the identifier of the core on which it is loaded to create secure access token 400, the secure access token 400 that it creates will only match the secure access token 400 created by the bootstrap during pre-boot if it is loaded on the trusted atom core 112b. In step 4c, SPI memory layout module 302 can use the secure access token 400 that it stores and the secure access token 400 provided by relocation and memory remap module 301 to confirm that atom core 112b is trusted. Again, the two secure access tokens 400 will only match when relocation and memory remap module 301 is loaded on the trusted atom core 112b. In this way, SPI memory layout module 302 can prevent any untrusted component/core from accessing the SPI memory layout. Once SPI memory layout module 302 has confirmed that relocation and memory remap module 301 is a trusted component running on the trusted atom core 112b, it can provide relocation and memory remap module 301 access to the SPI memory layout. For example, in some embodiments, SPI memory layout module 302 may provide the address of the SPI memory layout to relocation and memory remap module 301.

Figure 4E:
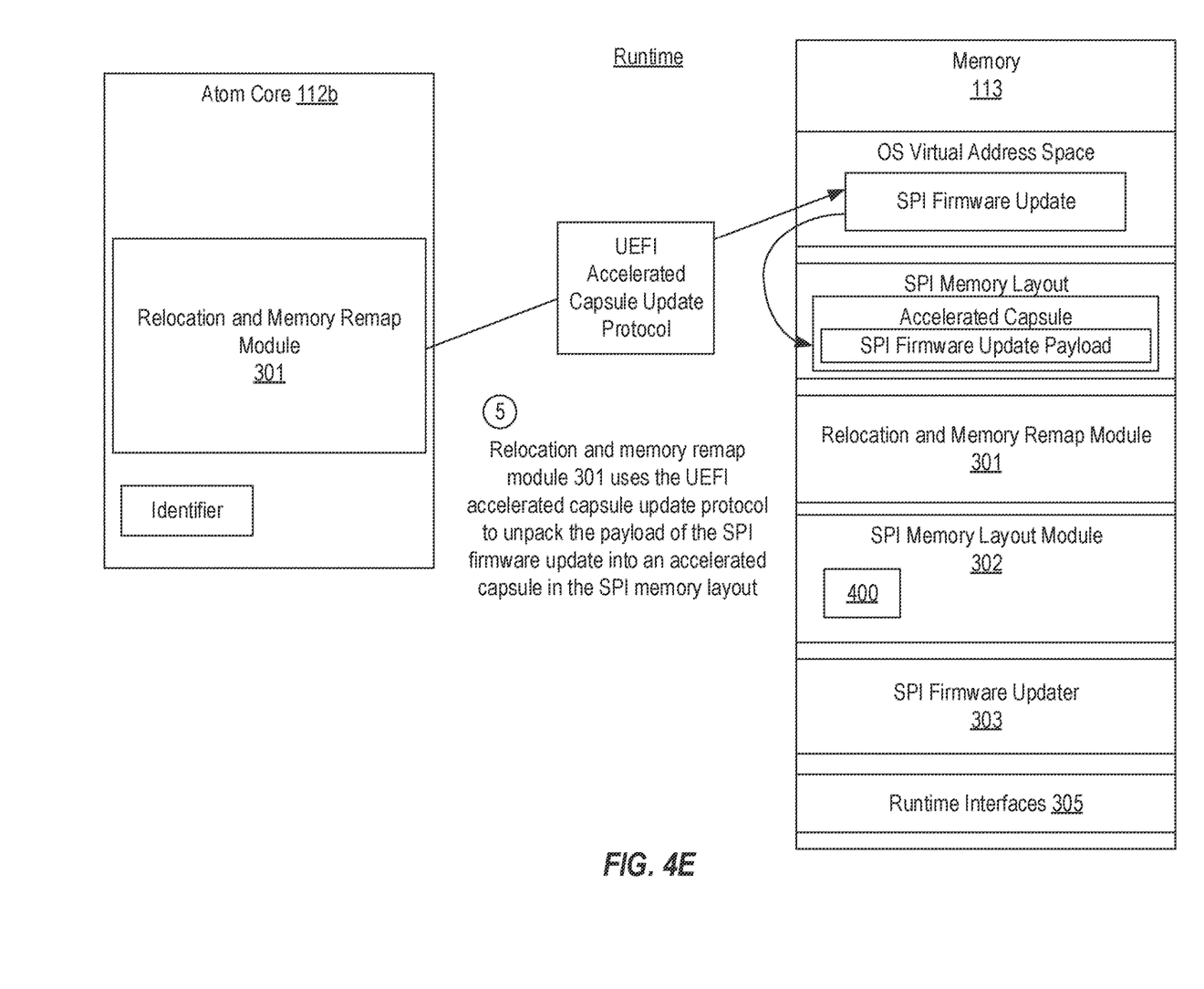

Turning to FIG. 4E, once it has obtained access to the SPI memory layout, in step 5, relocation and memory remap module 301 can unpack the payload of the SPI firmware update into an accelerated capsule format in the SPI memory layout. In some embodiments, relocation and memory remap module 301 may use a UEFI accelerated capsule update protocol for this purpose.

Figure 4F:
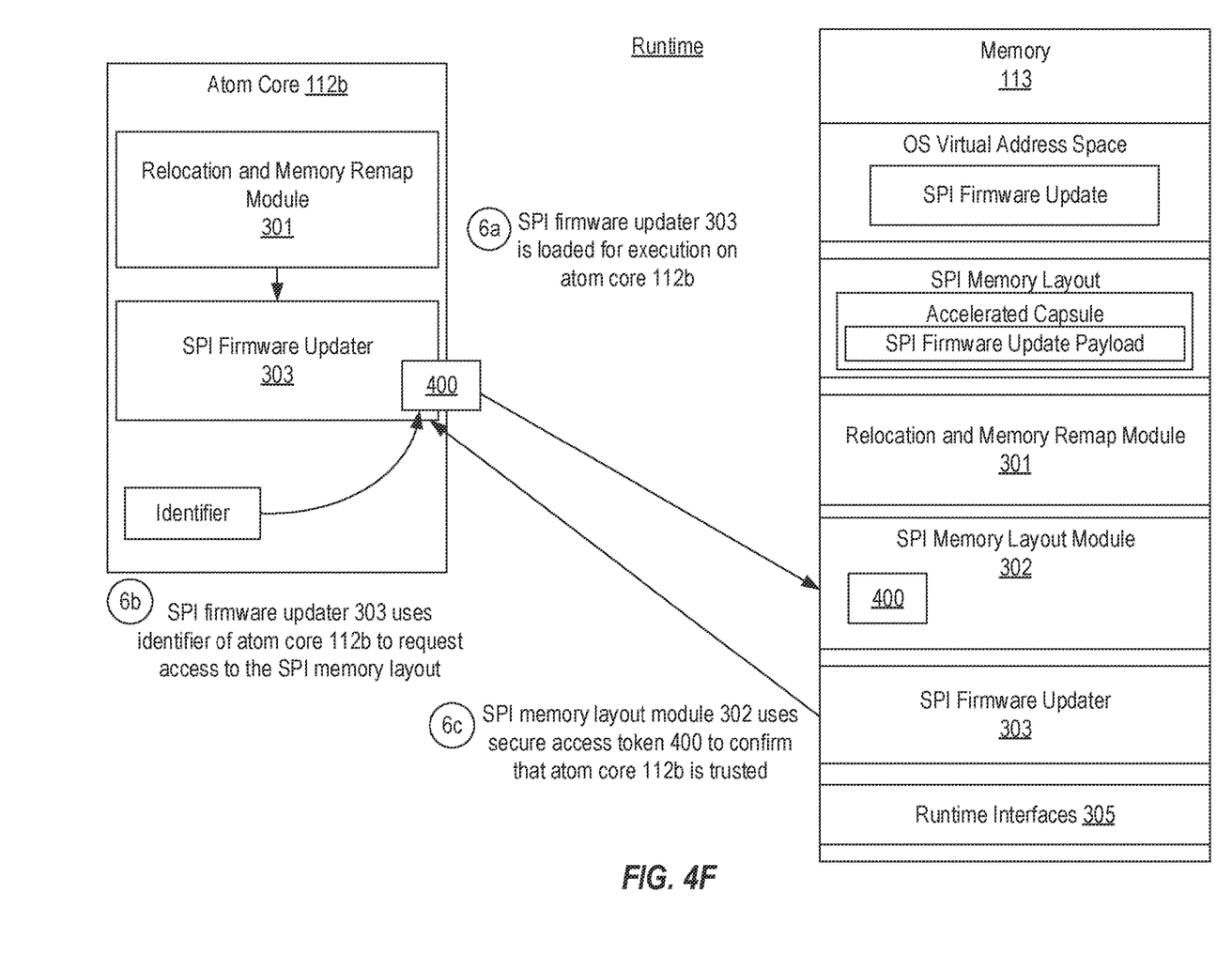

Turning to FIG. 4F, in step 6a, SPI firmware updater 303 can be loaded for execution on atom core 112b. For example, after it has created the accelerated capsule containing the payload of the SPI firmware update in the SPI memory layout, relocation and memory remap module 301 can invoke SPI firmware updater 303. In step 6b, SPI firmware updater 303 can obtain the identifier of atom core 112b and use it to create a secure access token 400 for requesting access to the SPI memory layout from SPI memory layout module 302. In step 6c, SPI memory layout module 302 can use the secure access token 400 that it stores and the secure access token 400 provided by SPI firmware updater 303 to confirm that atom core 112b is trusted. As described above, the two secure access tokens 400 will only match when SPI firmware updater 303 is loaded on the trusted atom core 112b.

Figure 4G:
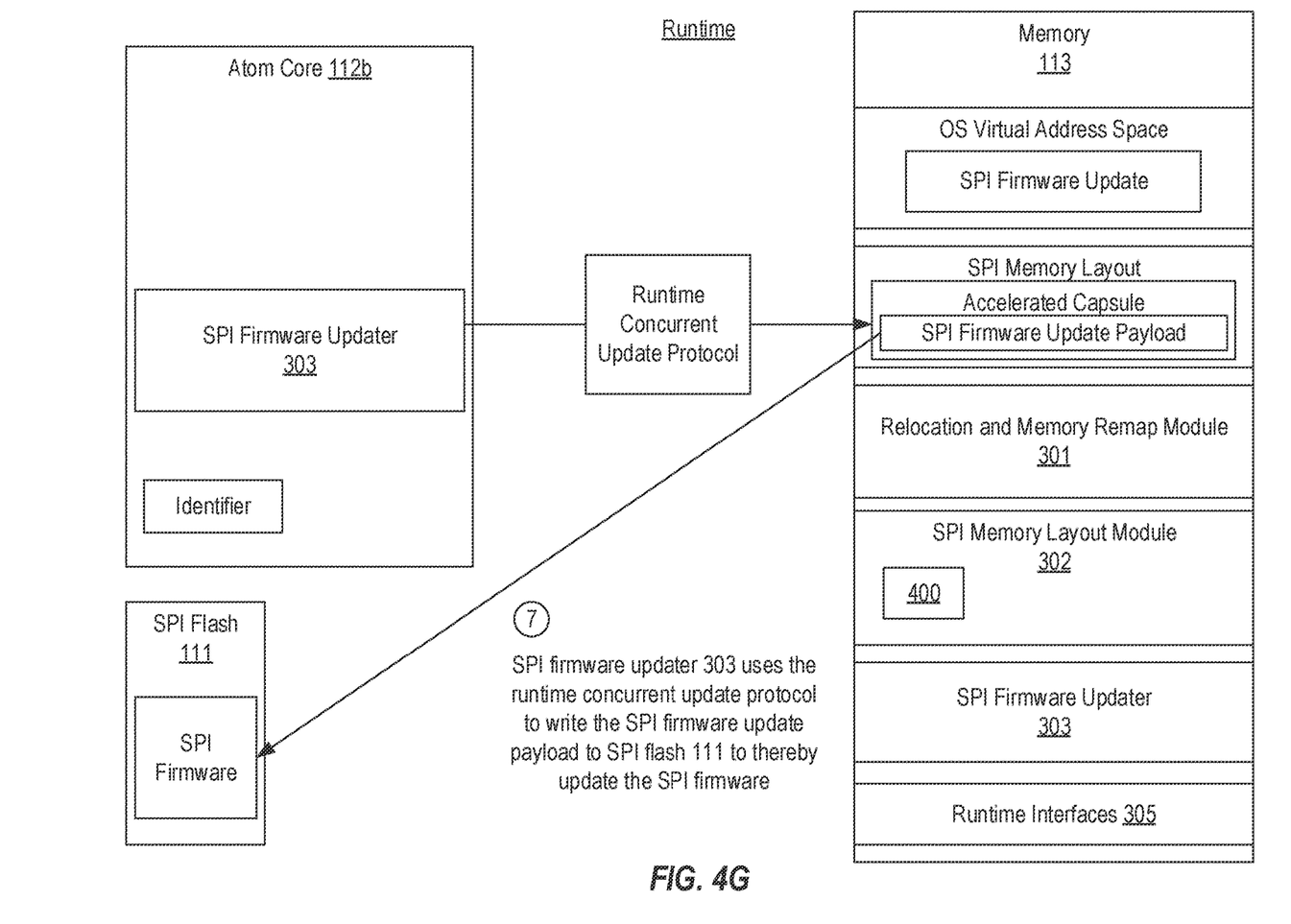

Turning to FIG. 4G, once it has obtained access to the SPI memory layout, SPI firmware updater 303 can access the accelerated capsule to write the payload of the SPI firmware update to SPI flash 111. In some embodiments, SPI firmware updater 303 may use a runtime concurrent update protocol for this purpose. As a result of step 7, the SPI firmware on SPI flash 111 will have been updated in accordance with the SPI firmware update. Notably, this update can occur, or more particularly, the writing of the update to SPI flash 111, occurs at runtime without reboot.

Figure 4H:
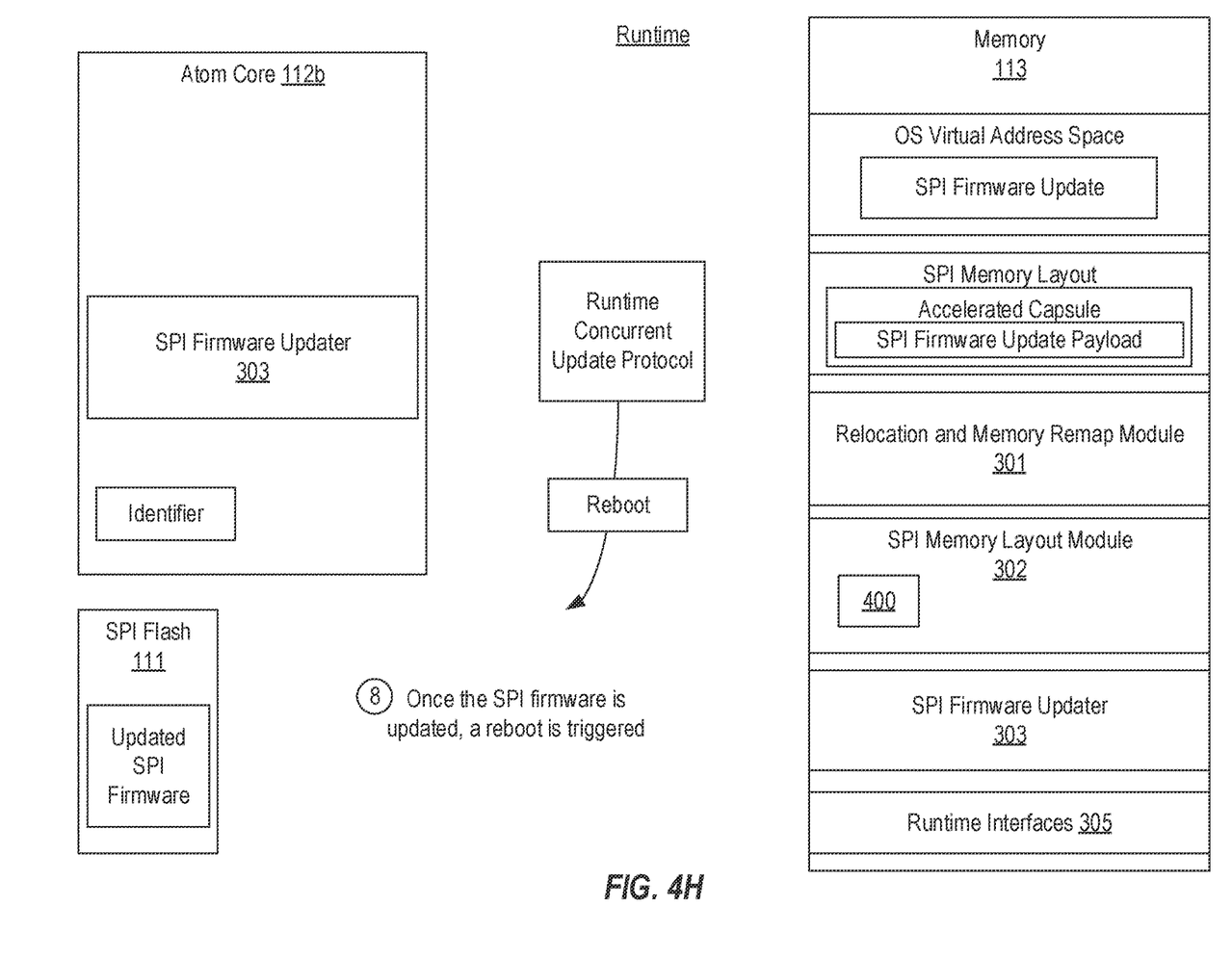

Turning to FIG. 4H, once the SPI firmware update has been written to SPI flash 111, in step 8, a reboot can be triggered. For example, in some embodiments, the runtime concurrent update protocol may be configured to trigger a reboot upon receiving confirmation that the SPI firmware update has been successfully written to SPI flash 111. As part of the reboot, the updated SPI flash can be immediately loaded from SPI flash 111 as opposed to having to wait for the update to be written during pre-boot.

As can be seen, embodiments of the present invention enable an update to the SPI firmware to be written to SPI flash 111 at runtime independent of the operating system. As a result, the user will not need to wait for the update to be installed during the pre-boot process. Instead, only a single reboot will be required after the update has been written to SPI flash 111 to load the updated SPI firmware. In this way, embodiments of the present invention minimize the burden and delay inherent in current SPI firmware update techniques.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for updating SPI firmware at runtime on a computing device that includes a CPU with multiple cores using a secure SPI flash access domain, the method comprising:
   selecting, during pre-boot, a first core from the multiple cores of the CPU;
   creating, during pre-boot, a first secure access token for the first core using an identifier of the first core;
   causing, during pre-boot, a relocation and memory remap module and a SPI memory layout module to remain available during runtime, the SPI memory layout module storing the first secure access token;
   creating, during pre-boot, an affinity between the relocation and memory remap module and the first core to thereby cause the relocation and memory remap module to be executed on the first core during runtime;
   receiving, at runtime, a SPI firmware update in virtual address space of an operating system;
   in response to receiving the SPI firmware update in the virtual address space and the relocation and memory remap module being loaded on the first core to process the SPI firmware update, creating, during runtime and by the relocation and memory remap module, a second secure access token using the identifier of the first core;
   providing, during runtime and by the relocation and memory remap module, the second token to the SPI memory layout module;
   comparing, during runtime and by the SPI memory layout module, the second token to the first token to confirm that the first core and the relocation and memory remap module executing on the first core are trusted; and
   relocating, during runtime and by the relocation and memory remap module, the SPI firmware update from the virtual address space to SPI flash.

2. The method of claim 1, wherein the SPI memory layout module provides an address of an SPI memory layout in the SPI flash to the relocation and memory remap module.

3. The method of claim 1, further comprising:
   invoking, by the relocation and memory remap module, a SPI firmware updater for execution on the first core after relocating the SPI firmware update.

4. The method of claim 2, wherein the first and second secure access tokens are a signed hash of the identifier of the first core of the CPU.

5. The method of claim 2, wherein the first core of the CPU is selected from among a plurality of low-power cores of the CPU.

6. The method of claim 1, further comprising:
   retaining the SPI flash in write-enabled mode.

7. The method of claim 1, further comprising:
   creating a SPI memory layout.

8. The method of claim 7, wherein the SPI firmware update is relocated to the SPI memory layout.

9. The method of claim 1, wherein the SPI memory layout module creates a SPI memory layout in the SPI flash during pre-boot and the relocation and memory remap module relocates the SPI firmware update to the SPI memory layout.

10. The method of claim 9, wherein creating the SPI memory layout comprises allocating pages of memory during the DXE phase of the UEFI boot sequence.

11. The method of claim 8, wherein relocating the SPI firmware update to the SPI memory layout comprises unpacking a payload of the SPI firmware update into an accelerated capsule using a UEFI accelerated capsule update protocol.

12. The method of claim 11, further comprising:
using a runtime concurrent update protocol to cause the payload of the SPI firmware update contained in the accelerated capsule to be written to the SPI flash.

13. The method of claim 12, further comprising:
causing, during pre-boot, a SPI firmware updater to remain available during runtime;
creating, during runtime and by the SPI firmware updater that is being executed on the first core, a third secure access token using the identifier of the first core;
providing, during runtime and by the SPI firmware updater, the third token to the SPI memory layout module; and
comparing, during runtime and by the SPI memory layout module, the third token to the first token to confirm that the first core and the SPI firmware updater executing on the first core are trusted;
wherein the SPI flash updater then writes the SPI firmware update to the SPI flash.

14. The method of claim 1, further comprising:
triggering a reboot after the SPI firmware update has been written to the SPI flash to thereby cause the updated SPI firmware to be loaded.

15. One or more computer storage media storing computer executable instructions which when executed implement a method for updating SPI firmware at runtime, the method comprising:
creating, during pre-boot, a secure SPI flash access domain including creating a secure access token for a core of a CPU, the secure access token for the core of the CPU being a signed hash of an identifier of the core of the CPU;
receiving, at runtime, a SPI firmware update; and
writing, during runtime, the SPI firmware update to SPI flash using the secure SPI flash access domain that was created during pre-boot.

16. The computer storage media of claim 15, wherein creating, during pre-boot, the secure SPI flash access domain comprises creating a SPI memory layout.

17. The computer storage media of claim 16, wherein the SPI firmware update is received in a virtual address space of an operating system, the method further comprising:
relocating the SPI firmware update to the SPI memory layout.

18. The computer storage media of claim 15, wherein the method further comprises:
using the secure access token to authorize the writing of the SPI firmware update to the SPI flash.

19. A computing device comprising:
a multicore CPU;
SPI flash;
memory; and
computer executable instructions which when executed implement a method for updating SPI firmware stored on the SPI flash at runtime, the method comprising:
selecting, during pre-boot, a first core of the multicore CPU;
creating, during pre-boot, a first secure access token for the first core using an identifier of the first core;
causing, during pre-boot, a relocation and memory remap module and a SPI memory layout module to remain available during runtime, the SPI memory layout module storing the first secure access token;
creating, during pre-boot, an affinity between the relocation and memory remap module and the first core to thereby cause the relocation and memory remap module to be executed on the first core during runtime;
receiving, at runtime, a SPI firmware update in virtual address space in the memory;
in response to receiving the SPI firmware update in the virtual address space and the relocation and memory remap module being loaded on the first core to process the SPI firmware update, creating, during runtime and by the relocation and memory remap module, a second secure access token using the identifier of the first core;
providing, during runtime and by the relocation and memory remap module, the second token to the SPI memory layout module;
comparing, during runtime and by the SPI memory layout module, the second token to the first token to confirm that the first core and the relocation and memory remap module executing on the first core are trusted; and
relocating, during runtime and by the relocation and memory remap module, the SPI firmware update from the virtual address space in the memory to the SPI flash.

20. The computing device of claim 19, wherein the SPI memory layout module provides an address of an SPI memory layout in the SPI flash to the relocation and memory remap module.

* * * * *